United States Patent Office 3,714,025
Patented Jan. 30, 1973

3,714,025
METHOD OF PROCESSING HEAVY SULFUR-BEARING PETROLEUM RESIDUES INTO LOW-SULFUR MOTOR AND BOILER PLANT FUELS
Alexandr Sergeevich Aigenson, Vladimir Vasilievich Fryazinov, and Fatkulla Khairullovich Malikov, Ufa, Julia Sergeevna Sabadash, Grozny, Vladimir Stefanovich Akimov and Natalia Ivanovna Dobrozrakova, Moscow, and Genrikh Arturovich Berg, Boris Mikhailovich Ezhov, and Georgy Alfonsovich Vorms, Ufa, U.S.S.R., and Rudolf Kubicka, Litvinov, Yaroslav Veprek, Uzameckehe parku, and Yaroslav Cir, Litvinov, Czechoslovakia, assignors to Bashkirsky Nauchno-Issledovatelsky Institut Po Pererabotke Nefti, Ufa, U.S.S.R.
No Drawing. Filed July 16, 1970, Ser. No. 55,577
Int. Cl. C10g 13/04
U.S. Cl. 208—86          4 Claims

ABSTRACT OF THE DISCLOSURE

A method of processing heavy sulfur-bearing petroleum residues into low-sulfur motor and boiler plant fuels, residing in that said petroleum residues are deasphaltized by being treated with solvents which are paraffin hydrocarbons with the number of carbon atoms from 4 to 8, or with mixtures thereof, at a temperature higher than the softening point of the asphaltene concentrate and under a pressure exceeding that of the solvent vapors at said temperature, under liquid-liquid extraction conditions, the deasphaltizate comprising resins and oils constituting an extract phase and the concentrate comprising asphaltenes, metalliferous compounds and ash-forming components with admixtures of resisns and oils constituting a raffinate phase. The resulting deasphaltizate is subjected to catalytic destructive hydrogenation on a catalyst, for which purpose use is made of oxides of metals belonging to Groups VI and VIII of the Periodic System, on aluminum oxide as a carrier, at a temperature of 350–450° C., under a pressure of 100–300 atm., with a space velocity of 0.2–5 hr.$^{-1}$ and at a volume ratio of hydrogen to the deasphaltizate of 200–2000:1.

The high-quality low-sulfur motor fuels obtained by said processing of petroleum residues can be used, e.g., for diesel and carburetor engines, and low-sulfur boiler plant fuels can be used in various power-generating plants, e.g., such as boiler plants.

The present invention relates to methods of processing heavy sulfur-bearing petroleum residues, and more particularly to methods of processing petroleum residues resulting after the distillation of fractions whose boiling range is up to 350 or 500° C., in the course of atmospheric or vacuum distillation of sulfur-bearing and high-sulphur petroleum with a high content of asphaltenes, ash-forming components and metalliferous compounds.

Low-sulfur motor fuels produced by processing petroleum residues may be employed, for instance, for powering carburetor and diesel engines, and low-sulfur boiler plant fuels may be used for operating various power plants, such as boiler plants.

It is known that heavy metals such as vanadium and nickel, ash-forming components, the major portion of nitrogen and oxygen present in petroleum under conditions of atmospheric and vacuum distillation concentrate in the heavy asphalt-resinous portion of petroleum, that is, in petroleum residues, and thus bring about an extremely high deterioration of the industrial properties of such residues. Difficulties are encountered both in direct utilization of these residues and in their further processing into low-sulfur motor and boiler plant fuels. A direct utilization of sulfur-bearing and high-sulphur petroleum residues as a boiler plant fuel results in an intensive air pollution with sulfur dioxide incurring irreparable damage to the nature and health of people within a wide region in the vicinity of both large steam stations and numerous small boiler plants. Moreover, great damage is incurred to boiler plants when using high-sulfur petroleum residues featuring an enhanced content of metals (such as vanadium and sodium) due to an intensive corrosion of the equipment and destruction of refractory materials. Such residues are altogether inapplicable in metallurgy because of great quantities of sulfur contained therein.

A most radical and convenient way of processing heavy petrol residues for producing high-quality low-sulfur motor and boiler plant fuels would be their direct catalytic destructive hydrogenation. However, the now-existing catalysts and techniques do not always provide for the realization of a direct hydrogenation processing of these residues. Asphaltenes and metals block the active centers and, after a short period of time, close the pore openings of the catalysts. For this reason a direct catalytic hydrogenation processing of petroleum residues, even under high pressure conditions (of 300 atm. and over) is inevitably associated with catalyst poisoning.

For increasing the service life of catalysts and for enhancing their activity and selectivity, it is necessary first to remove asphaltenes and concomitant heavy metals and ash-forming components from heavy sulfur-bearing petroleum residues.

A number of methods are known for removing asphaltenes, heavy metals and ash-forming components from heavy sulfur-bearing petroleum residues prior to the hydrogenation processing of the latter. These methods are based on destroying the colloidal structure of petroleum residues and on coagulating asphaltenes by subjecting them to the action of various reactants such as boric complexes, or to temperature effects in case of catalytic thermal treatment under pressure in the atmosphere of hydrogen. Said methods, however, are associated with difficulties in the utilization of waste products after the treatment of petroleum residues with the above-mentioned reactants, and with complicated equipment required for carrying out catalytic heat treatment.

Also known is a method of processing heavy sulfur-bearing petroleum residues into low-sulfur motor and boiler plant fuels by deasphaltizing said residues by treating them with solvents such as paraffin hydrocarbons having from 4 to 8 carbon atoms or mixtures thereof. Said solvents dilute the petroleum residues and thus destroy their colloidal structure. Asphaltenes constituting the solid phase coagulate with the formation of an asphaltene concentrate comprising asphaltenes, metalliferous compounds and ash-forming components, which concentrate then precipitates. The product free from the asphaltene concentrate (deasphaltizate based on resins and oils) is dissolved in said solvents. A deasphaltizate is thus obtained containing less than 1 wt. percent of asphaltenes and featuring better ash content and viscosity characteristics. The above-described deasphaltizing process is carried out at a temperature below the softening point of the asphaltene concentrate.

The deasphaltizate is further subjected to catalytic destructive hydrogenation on a catalyst, oxides of metals belonging to Groups VI and VIII of the Periodic System being used for this purpose on aluminum oxide as a carrier, at a temperature of 350–450° C. and pressure of 100–300 atm., the space velocity of the stock material being 0.2–5 hr.$^{-1}$, and the molar ratio of hydrogen to the deasphaltizate, 200–2000:1, respectively (cf., e.g. Author's Certificate of the U.S.S.R. No. 159587; U.S. Patents Nos. 3,132,088 and 3,159,571; British Pats. Nos. 935,725 and 938,193).

In case of destructive hydrogenation of the deasphaltizate obtained in the above-described fashion the catalyst operates for a long period of time since its poisoning is retarded, and the resulting low-sulfur motor and boiler plant fuels feature high-quality characteristics.

However, the industrial realization of the process of removing the asphaltene concentrate from the petroleum residues at low and medium temperatures, when performed in accordance with the said method, involves serious difficulties associated with the evacuation of the precipitated solid asphaltenes from the apparatus and with the transfer of the precipitated material via pipelines.

The fact is that at low temperatures (below 60° C.) asphaltenes are solids with a particle size of $10^{-6}$ mm., and at temperatures of 60–130° C. asphaltenes make up a viscous sticky mass (the softening point of pure asphaltenes being above 140° C.) The discharge of such a material from the apparatus and its further transportation are not at all easy.

The precipitation of asphaltenes in excess light paraffin hydrocarbons at low and medium temperatures is based only on the coagulation phenomenon. Therefore solid asphaltenes can be separated from the solution either by gravitational settling, or by centrifugal settling, or, else, by filtration. The utilization of gravitational settling of asphaltenes on an industrial scale at low and medium temperatures involves difficulties in view of the fact that excessively small dimensions of the asphaltene particles necessitate great volumes of settling apparatus. On the other hand, centrifugation and filtration require complicated process equipment.

Moreover, in the said known method the possibilities of controlling the process are limited, since the precipitation of asphaltenes is based solely on the coagulation phenomenon.

It is an object of the present invention to provide such a method of processing heavy sulfur-bearing petroleum residues into low-sulfur motor and boiler plant fuels, which would make it possible to simplify the removal of the separated asphaltene concentrate from the apparatus.

Another object of the present invention is the provision of such a method which would be easily controllable.

In accordance with said and other objects, the present invention resides in that heavy sulfur-bearing petroleum residues are deasphaltized by treating them with solvents which are paraffin hydrocarbons containing from 4 to 8 carbon atoms or with their mixtures, at a temperature higher than the softening point of the asphaltene concentrate and under a pressure exceeding that of the solvent vapors at said temperature, under liquid-liquid extraction conditions, the deasphaltizate based on resins and oils being an extract phase, and the concentrate comprising asphaltenes, metalliferous compounds, and ash-forming components with admixtures of resins and oils being a raffinate phase; the resulting deasphaltizate is subjected to catalytic destructive hydrogenation on a catalyst, for which purpose oxides of metals belonging to Groups VI and VIII of the Periodic System are used on a carrier which is aluminum oxide, at a temperature of 350–450° C. and under a pressure of 100–300 atm., with the space velocity of 0.2–5 hr.$^{-1}$ and molar ratio of hydrogen to the deasphaltizate, 200–2000:1 respectively.

The treatment of petroleum residues with solvents is recommended to be carried out at a temperature of 140–190° C.

It is expedient, that said treatment of petroleum residues with solvents should be carried out with the solvents and the stock material being taken in a weight ratio of 2–4:1.

The treatment of petroleum residues with solvents should preferably be effected in a counter current manner.

Deasphaltizing carried out under said conditions makes it possible to effect the process in conventional extraction apparatus which operate in accordance with the liquid-liquid extraction principle.

The present method of processing heavy sulfur-bearing petroleum residues provides for a high selectivity of the deasphaltizing process with an enhanced yield of the deasphaltizate (containing less than 1 wt. percent of asphaltenes). The deasphaltizate free from asphaltenes, ash-forming components and metalliferous compounds contains 40–60 wt. percent less of coking substances than the stock materials (heavy petroleum residues). The content of heavy metals (including vanadium and nickel) is reduced by 60–75 wt. percent, and the (conditional) viscosity, by more than 2 times. The content of sulfur and nitrogen is somewhat diminished.

The isolation of asphaltenes is practically equal to their absolute content in the petroleum residues. The separated asphaltene concentrate contains more than 70 wt. percent of asphaltenes and less than 30 wt. percent of resins and oils. Removed together with the asphaltenes are up to 75 wt. percent of metalliferous compounds and practically all the ash-forming components. When the deasphaltizing is carried out under the above-specified conditions, the separated asphaltene condensate is removed from the extraction apparatus in the form of a liquid. For adjusting the interface level use is made of conventional equipment.

The process of separation of asphaltenes from petroleum residues at temperatures higher than the softening point of the asphaltene concentrate is a coagulation-extraction process and can be effected at higher rates and in more compact apparatus than in the previously known method, the quality and yield of the products being controllable so as to suit the user's requirements. The carrying out of the deasphaltizing under the above-specified temperatures, while providing for an increase in the removal of asphaltenes from petroleum residues, makes the viscosity breaking stage superfluous (cf. U.S. Pat. No. 3,132,088 and British Pat. No. 938,193). The obviation of the viscosity breaking stage in the processing of petroleum residues comprising the separation of asphaltenes is a positive factor, since it becomes possible to remove asphaltenes in a chemically unchanged state, without any traces of decomposition. Therefore the thus removed asphaltenes preserve their valuable properties and can be successfully used in various branches of industry as a substitute for natural asphaltenes, for instance, as a component for producing various types of high-quality bitumen, as a component of high-quality lacquers, as an effective binder for briquetting coal fines, etc.

Thus, the herein-proposed method of processing heavy sulfur-bearing petroleum residues, employing a new principle of deasphaltizing, is technologically simple, economically expedient as compared to the methods known heretofore, can be realized on highly efficient apparatus, and makes it possible to produce low-sulfur high-quality motor and boiler plant fuels.

The present method of processing heavy sulfur-bearing petroleum residues is effected as follows.

As has been pointed out hereinabove, first petroleum residues are deasphaltized in conventional extraction apparatus. As solvents with which said petroleum residues are terated, use may be made of either individual paraffin hydrocarbons with from 4 to 8 carbon atoms, or of various combinations of these hydrocarbons, such as light petrol boiling at a temperature below 65° C. The petroleum residues and solvent heated to a temperature above the softening point of the asphaltene concentrate, preferably to 140–190° C., are fed to the extraction apparatus, preferably in a counter current manner. The process of deasphaltizing is carried out under liquid-liquid extraction conditions. For adjusting the interface surface (between the asphaltizate and asphaltene concentrate), use is made of conventional apparatus employed for measuring and controlling the liquid-liquid interface surface level.

The asphaltene concentrate separated in the course of the deasphaltizing process is removed from the extraction apparatus in a liquid state. Said asphaltene concentrate in its physico-mechanical properties does not differ from natural asphaltenes, and may be used as a substitute for the latter in various branches of industry.

The deasphaltizate freed from the asphaltene concentrate is taken to catalytic destructive hydrogenation. Depending on the conditions of the hydrogenation processing, low-sulfur motor or boiler plant fuels may be produced from the deasphaltizate (the last-mentioned fuels containing from 0.5 to 1.5 wt. percent of sulfur). A concurrent producing of motor and boiler plant fuels is also possible.

The hydrogenation processing may be carried out either in one, or in a plurality of series-connected reactors. The deasphaltizate is fed to the hydrogenation either undiluted, or preliminarily diluted with a petroleum fraction to reduce the viscosity thereof (such as gas oil fractions obtained by direct distillation of petroleum or from hydrogenate).

Hydrogenation is carried out at a temperature of 350–450° C., preferably at a temperature ranging within 380–430° C., with a space velocity of 0.2–5 hr.$^{-1}$, preferably of 0.5–1 hr.$^{-1}$ and with hydrogen and deasphaltizate being taken in a molar ratio of 200–2000:1, preferably in a molar ratio of 500–1000:1, in the presence of a catalyst on a carrier, oxides of metals belonging to Groups VI and VIII of the Periodic System being used as a catalyst and aluminum oxide as a catalyst carrier, respectively.

Said processing of petroleum residues results in the obtaining of high-quality motor and boiler plant fuels.

For a better understanding of the present invention, given hereinbelow are examples illustrating the processing of heavy sulfur-bearing petroleum residues (residual products after distillation of sulfur-bearing and high-sulfur petroleum with a high content of asphaltenes, ash-forming components and metalliferous compounds).

EXAMPLE 1

A residue of sulfur-bearing resiniferous petroleum, constituting 25 wt. percent of the petroleum was deasphaltized by treating it with light petrol whose boiling point is below 65° C. The process was carried out in a counter current manner on a continuous-action pilot plant with a throughput capacity of 6 lit./hr. at a temperature of 140–155° C. (above the softening point of the asphaltene concentrate) under a pressure of 20 atm. and with the volume ratio of the solvent and stock material of 3:1. The yield of the deasphaltizate was 85 wt. percent, the degree of deasphaltizing was 94%.

The characteristics of the stock material (heavy petroleum residue) and deasphaltizate are presented in Table 1.

TABLE 1

| 1 | 2 | 3 |
|---|---|---|
| Characteristics | Heavy petroleum residue | Deasphaltizate |
| Density, $\rho_4^{20}$ | 1.009 | 0.983 |
| Softening point (ring and ball test), ° C | 43 | 31 |
| Coking index (by Conradson), wt. percent | 18.90 | 12.55 |
| Ash content, wt. percent | 0.1 | 0.058 |
| Bogdanov distillation: | | |
| Boiling point, ° C | 384 | 350 |
| Boils out below 475° C., vol. percent | 2.0 | 2.5 |
| Boils out below 500° C., vol. percent | 11.0 | 16.0 |
| Hydrocarbon groups, wt. percent: | | |
| Paraffin-naphthene hydrocarbons | 14.8 | 16.6 |
| Light aromatic hydrocarbons | 15.8 | 15.3 |
| Medium aromatic hydrocarbons | 20.7 | 29.1 |
| Heavy aromatic hydrocarbons | 19.7 | 18.4 |
| Resins | 17.5 | 19.7 |
| Asphaltenes | 11.5 | 0.9 |
| Elementary composition, wt. percent: | | |
| Carbon | 84.67 | 84.7 |
| Hydrogen | 11.00 | 11.65 |
| Sulphur | 3.6 | 3.5 |
| Nitrogen | 0.43 | 0.4 |
| Metals and oxygen | 0.25 | 0.15 |
| Content of metals, wt. percent: | | |
| Nickel | 0.015 | 0.006 |
| Vanadium | 0.026 | 0.0105 |

The obtained deasphaltizate was subjected to catalytic destructive hydrogenation on a fixed-bed cobalt-molybdenum catalyst on an active alumina (aluminum oxide) carrier at various temperatures (380, 400 and 420° C.), under various pressures (50, 100 and 300 atm.) and with different space velocities (0.5 and 1 hr.$^{-1}$) with a view to investigating the influence of different process conditions on the results of hydrogenation. Hydrogen and the deasphaltizate were taken in a volume ratio of 1000:1

The results of the investigation are presented in Tables 2, 3 and 4.

TABLE 2

Hydrogenation of deasphaltizate at temperatures of 380, 400 and 420° C., under a pressure of 100 atm. and with a space velocity of 0.5 hr.$^{-1}$

| Results of hydrogenation | Working temperatures, ° C. | | |
|---|---|---|---|
| | 380 | 400 | 420 |
| Degree of desulphurization of deasphaltizate, percent: | | | |
| At the start of the process | 60 | 86 | 95 |
| After 100 hours | 55 | 81 | 86 |
| After 200 hours | 52 | 75 | 80 |
| After 300 hours | 50 | 68 | 74 |
| After 400 hours | 48 | 61 | 73 |
| After 500 hours | 48 | 58 | 70 |

As can be seen from the above data, the degree of desulphurization of the product becomes higher with an increase in the temperature.

TABLE 3

Hydrogenation of deasphaltizate at a temperature of 400° C., under pressures of 50, 100 and 300 atm. and with a space velocity of 0.5 hr.$^{-1}$

| Results of hydrogenation | Working pressure, atm. | | |
|---|---|---|---|
| | 50 | 100 | 300 |
| Degree of desulphurization of deasphaltizate, percent: | | | |
| At the start of the process | 64 | 86 | 95 |
| After 100 hours | 61 | 81 | 91 |
| After 200 hours | 55 | 75 | 88 |
| After 300 hours | 49 | 68 | 83 |
| After 400 hours | | 61 | 80 |
| After 500 hours | | 58 | 78 |

As can be seen from this table, an increase in the pressure results in an increased degree of desulfurization of the deasphaltizate. Thus, already under a pressure of 100 atm. a sufficiently high degree of desulfurization of the product is attained. Besides, under otherwise equal conditions (temperature and space velocity), an increase in the pressure results in a longer service life of the catalyst.

TABLE 4

Hydrogenation of deasphaltizate at a temperature of 400° C., under a pressure of 100 atm. and with space velocities of 0.5 and 1 hr.⁻¹

| Results of hydrogenation | Space velocity, hr. | |
|---|---|---|
| | 0.5 | 1.0 |
| Degree of desulphurization of deasphaltizate, percent: | | |
| At the start of the process | 86 | 75 |
| After 100 hours | 81 | 68 |
| After 200 hours | 75 | 61 |
| After 300 hours | 68 | 53 |
| After 400 hours | 61 | |
| After 500 hours | 58 | |

The data presented in the above table show, that decrease in the space velocity brings about an increase in the degree of desulfurization of the deasphaltizate.

In Table 5 hereinbelow data are presented which show the influence produced by preliminary dilution of the deasphaltizate with petroleum distillates featuring a lower boiling point than the deasphaltizate on the results of hydrogenation. For comparison data are also presented which characterize the results of hydrogenation of the stock petroleum residue which has not been subjected to deasphaltizing, but has likewise been diluted with the petroleum distillate (the characteristics of the latter are given in Table 1). In all the cases the voluminal ratio of the processed product and the petroleum distillate was 1:1. The value presented in Table 5 are recalculated for hydrogenation products distilled off at a temperature up to 500° C.

tized by treating with light petrol boiling at a temperature not in excess of 65° C. The process was carried out in a counter current manner on a continuous-action pilot plant of a throughput capacity of 6 lit./hr. at a temperature of 160–180° (above the softening point of the asphaltene concentrate), under a pressure of 25 atm. and at a volume ratio of the solvent and stock material of 3:1.

TABLE 6

| 1 | 2 | 3 |
|---|---|---|
| Characteristics | Heavy petroleum residue | Deasphaltizate |
| Density, $\rho_4^{20}$ | 1.012 | 0.982 |
| Softening point (ring and ball test), ° C | 35 | 29 |
| Coking index (by Conradson), wt. percent | 18.0 | 10.5 |
| Ash content, wt. percent | 0.25 | 0.041 |
| Bogdanov distillation: | | |
| Boiling point, ° C | 389 | 331 |
| Boils out below 450° C, vol. percent | 10.0 | 13.0 |
| Boils out below 475° C, vol. percent | 15.5 | 18.0 |
| Boils out below 500° C, vol. percent | 24.0 | 30.5 |
| Hydrocarbon groups, wt. percent: | | |
| Paraffin-naphthene hydrocarbons | 12.5 | 13.7 |
| Light aromatic hydrocarbons | 7.8 | 9.4 |
| Medium aromatic hydrocarbons | 17.2 | 23.4 |
| Heavy aromatic hydrocarbons | 21.8 | 21.6 |
| Resins | 29.0 | 31.0 |
| Asphaltenes | 11.7 | 0.9 |
| Elementary composition, wt. percent: | | |
| Carbon | 83.7 | 84.6 |
| Hydrogen | 10.1 | 10.7 |
| Sulphur | 4.42 | 4.20 |
| Nitrogen | 0.43 | 0.37 |
| Metals and oxygen | 1.35 | 0.13 |
| Content of metals, wt. percent: | | |
| Nickel | 0.010 | 0.005 |
| Vanadium | 0.031 | 0.009 |

TABLE 5

Hydrogenation at 400° C., 100 atm. and space velocity of 0.5 hr.⁻¹

| | 1 | 2 | 3 | 4 | 5 |
|---|---|---|---|---|---|
| | | Kind of stock material processed | | | |
| Results of hydrogenation | | Undiluted deasphaltizate | Deasphaltizate diluted with diesel fuel | Deasphaltizate diluted with petroleum vacuum distillate | Petroleum residue (25% of petroleum) not subjected to deasphaltizing, diluted with petroleum vacuum distillate |
| Degree of desulphurization, percent: | | | | | |
| At the start of the process | | 86 | 90 | 88 | 70 |
| After 100 hours | | 81 | 86 | 83 | 63 |
| After 200 hours | | 75 | 80 | 77 | 57 |
| After 300 hours | | 68 | 75 | 70 | 51 |
| After 400 hours | | 61 | 72 | 63 | 45 |
| After 500 hours | | 58 | 70 | 62 | 41 |
| Increment of fraction boiling out below 350° C. as calculated for deasphaltizate, wt. percent | | 39 | 17.5 | | 9 |

As can be seen from this table, the degree of desulfurization of the deasphaltizate (both diluted and undiluted) under said conditions is much higher than the degree of desulfurization of the initial petroleum residue; the period of the functional activity of the catalyst is also prolonged. It is likewise evident, that preliminary dilution of the deasphaltizate is favorable for the hydrogenation process. The hydrogenation of diluted deasphaltizate results in an enhanced desulfurization of the product and in a longer service life of the catalyst.

The hydrogenation of the deasphaltizate under the above-specified conditions, when the degree of desulfurization was first 86%, resulted in a product containing about 8 wt. percent of petrol, 31 wt. percent of diesel fuel and 30 wt. percent of a fraction boiling out at a temperature ranging from 350 to 520° C. The petrol contained 0.05 wt. percent of sulfur. The diesel fuel had an octane number equal to 53 and contained 0.12 wt. percent of sulfur. Said fraction (350 to 520° C.) contained 0.35 wt. percent of sulphur, its viscosity was 25 cs. at 50° C., and its settling point was 35° C.

EXAMPLE 2

A residue of high-sulfur high-resinous petroleum amounting to 47 wt. percent of petroleum was deasphal- The yield of the deasphaltizate was 84.4 wt. percent, the degree of deasphaltizing was 92.5%.

The characteristics of the stock material (heavy petroleum residue) and deasphaltizate are given in Table 6, above.

The obtained deasphaltizate was subjected to catalytic destructive hydrogenation on a fixed-bed cobalt-molybdenum catalyst on an aluminum oxide carrier at temperatures ranging within 400 to 450° C. under a pressure of 150 atm., with a space velocitp of 0.5 hr.⁻¹ and with a volume ratio of hydrogen and the deasphaltizate of 1000:1. As the catalyst activity diminished in the course of operation, the temperature was gradually from 400 to 450° C. The degree of desulfurization of the deasphaltizate was about 70%.

Given in Table 7 are data on the yield of separate fractions obtained by distillation of the hydrogenate (the yield being given in wt. percent of the hydrogenate).

TABLE 7

| | Temperature within reaction zone, ° C. | | |
|---|---|---|---|
| Fractions | 400 | 410 | 425 |
| Fraction boiling below 180° C | 2.0 | 4.6 | 7.0 |
| Fraction boiling within 180 to 350° C | 17.0 | 22.3 | 34.5 |
| Fraction boiling within 350 to 420° C | 11.1 | 13.1 | 11.0 |
| Fraction boiling above 420° C | 70.0 | 60.0 | 47.5 |

Presented hereinbelow is a total material balance for the hydrogenation of deasphaltizate, with the catalyst operation period between oxidation reactivations thereof being about 1500 hours and the total duration of the hydrogenation processing being 4500 hours.

Takane, in wt. percent

| | |
|---|---|
| Stock material (petroleum residue) | 100 |
| Hydrogen for reaction | 1.8 |
| Total, in wt. percent | 101.8 |

Obtained, in wt. percent

| | |
|---|---|
| Hydrogen sulfide | 3.4 |
| Hydrocarbon gases and ammonia | 4.4 |
| Hydrogenate | 93 |
| (a) Fraction boiling below 180° C. | 4.4 |
| (b) Fraction boiling within 180 to 350° C. | 24.0 |
| (c) Fraction boiling within 350 to 425° C. | 12.0 |
| (d) Fraction boiling above 425° C. | 52.6 |
| Losses | 1.0 |
| Total, in wt. percent | 101.8 |

The fraction of the hydrogenate, boiling out below 180° C. containing about 0.05 wt. percent of sulfur, and the fraction boiling out within 180 to 350° C. containing about 0.15 wt. percent of sulfur are used as motor fuels, and those fractions which boil out above 350° C. and contain 1.2 to 1.5 wt. percent of sulfur are used as boiler plant fuels.

Though the present invention has been described in connection with the preferred embodiment thereof, it is to be understod that various changes and modifications may be resorted to without departing from the spirit and scope of the invention, as those skilled in the art will easily understand. Such changes, modifications and alterations are to be considered as falling within the true spirit and scope of the invention as defined in the appended claims.

What is claimed is:

1. A method of processing a heavy sulfur-bearing petroleum residue into low-sulfur motor and boiler plant fuels which comprises deasphaltizing said residue to form a deasphaltizate and an asphaltene concentrate by treatment with a solvent selected from the group consisting of paraffin hydrocarbons having 4 to 8 carbon atoms and mixtures thereof at a temperature above the softening point of said asphaltene concentrate said temperature being at least 140° C. at a pressure exceeding the vapor pressure of said solvent at said temperature under liquid-liquid extraction conditions, said deasphaltizate comprising resins and oils in an extract phase and said concentrate comprising asphaltenes, metalliferous compounds and ash-forming components with additional resins and oils in a raffinate phase; subjecting said deasphaltizate to catalytic destructive hydrogenation on a catalyst comprising oxides of metals of Groups VI and VIII of the Periodic System on aluminum oxide as a carrier at a temperature of 350–450° C., under a pressure of 100–300 atm., with a space velocity of 0.2–5 hr.$^{-1}$ and at a volume ratio of hydrogen to the deasphaltizate of 200–2000:1.

2. A method as claimed in claim 1, wherein the treatment of petroleum resides with solvents is effected at a temperature of 140–190° C.

3. A method as claimed in claim 1, wherein the treatment of petroleum residues with solvents is effected with the solvents and stock material being taken in a weight ratio of 2–4:1.

4. A method as claimed in claim 1, wherein the treatment of petroleum residues with solvents is carried out in a counter current manner.

References Cited

UNITED STATES PATENTS

| | | | |
|---|---|---|---|
| 2,697,681 | 12/1954 | Murray et al. | 208—86 |
| 3,132,088 | 5/1964 | Beuther et al. | 208—86 |
| 3,227,645 | 1/1966 | Frumkin et al. | 208—86 |

HERBERT LEVINE, Primary Examiner

U.S. Cl. X.R.

208—112, 309